July 13, 1926.

W. F. HENDRY

DRY BATTERY

Filed June 12, 1924

1,592,361

INVENTOR
W. F. Hendry
BY
his ATTORNEY

Patented July 13, 1926.

1,592,361

UNITED STATES PATENT OFFICE.

WILLIAM F. HENDRY, OF OSSINING, NEW YORK, ASSIGNOR, BY MESNE ASSIGNMENTS, TO NATIONAL CARBON COMPANY, INC., OF NEW YORK, N. Y., A CORPORATION OF NEW YORK.

DRY BATTERY.

Application filed June 12, 1924. Serial No. 719,608.

This invention relates to improvements in dry cells and more particularly to multiple batteries in which the individual cells are connected in parallel with each other.

In my copending application Serial No. 654,613, filed July 30, 1923, a dry cell structure is described in which a plurality of compacted tablets are combined into a dry battery having a common carbon electrode and a plurality of zinc electrodes, the latter being provided in the form of discs or washers between superimposed tablets. The zinc discs are interconnected by means of a single container enclosing the whole assembly and in which the discs are frictionally held. In order to insure the thorough soaking of the whole structure and particularly the linings surrounding the depolarizing tablets, in accordance with the present invention the zinc discs are perforated to permit the ready passage of liquid down to the lowest part of the battery and, furthermore, the zinc discs are corrugated so that channels are formed above and below each compacted tablet through which the liquid is readily distributed throughout the structure. The advantage of providing grooves or corrugations in the zinc washers rather than in the tablets resides mainly in the fact that the manufacturing process is improved because grooved tablets break more easily than plain tablets, and grooves in tablets are more easily stopped up than in the zinc washers.

The invention will be more clearly understood from the following detailed description of a preferred embodiment.

Figure 1:
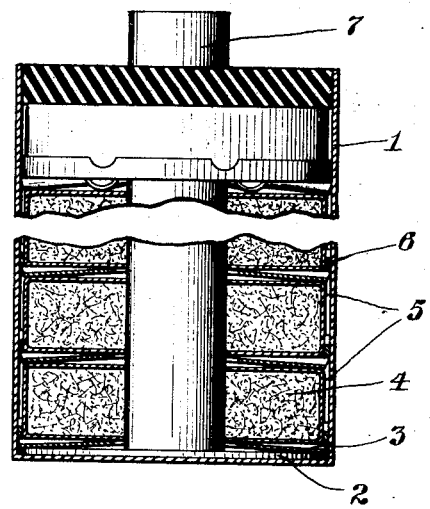
Figure 2:
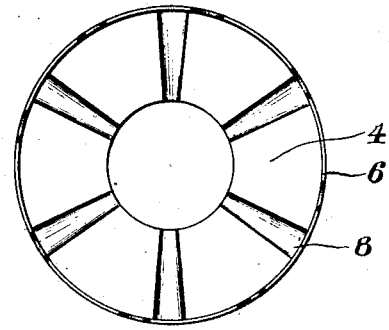

In the drawings, Fig. 1 is a vertical cross-section of a battery assembled in accordance with the present invention; Fig. 2 is a top view of a zinc washer; and Fig. 3 is a side elevation of such washer.

Referring now to the drawings, 1 is a zinc can the bottom of which is covered with a disc 2 of paper or other insulating material. On top of this disc, in successive layers, zinc disc 3 and compacted depolarizing tablets 4 are provided, each depolarizing tablet 4 being wrapped or otherwise coated with a layer of porous cellulose material, such as a paper lining 5, which is preferably coated with paste. The edge of each zinc disc 3 is turned up into a rim 6 which is in frictional engagement with the zinc can 1, thus affording an electrical connection between the zinc discs of the various cells. The carbon electrode 7 is common to all the cells and projects through perforations provided in the tablets 4 and in the zinc washers 3. The perforations in the zinc washers are large enough to clear the carbon electrode 7 so as to avoid short circuits.

Figure 3:
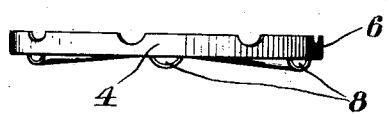

The zinc washer 3, as clearly shown in Figs. 2 and 3, is radially corrugated, which corrugations provide radial passageways for liquid that seeps down adjacent to the carbon electrode 7. Furthermore, in bending up the rim 6 the corrugated zinc splits at the ridges and these split portions are enlarged, by means of a suitable corrugated die, into holes 8 through which the liquid will find ready access to the lower tablets.

What I claim is:

1. In a dry battery, a plurality of tablets compacted of depolarizing mixture, a zinc container for said tablets, zinc discs separating adjacent tablets and contacting with said container, and grooves and perforations in each disc.

2. In a dry battery, a plurality of tablets compacted of depolarizing mixture, an absorbent insulating lining surrounding each tablet, a carbon electrode projecting through said tablets, a zinc container surrounding said tablets, and corrugated zinc washers separating said tablets and contacting with said zinc container.

3. In a dry battery, a plurality of tablets compacted of depolarizing mixture, an absorbent insulating lining surrounding each tablet, a carbon electrode projecting through said tablets, a zinc container surrounding said tablets, and perforated zinc washers separating said tablets and contacting with said zinc container.

4. In a dry battery, a plurality of tablets compacted of depolarizing mixture, a lining of cellulose absorbent material surrounding each tablet, a carbon electrode projecting through said tablets, a zinc container electrode surrounding said tablets, zinc discs separating adjacent tablets; each of said zinc discs being provided with a central perforation clearing said carbon electrode, corrugations radiating from said central perforation, an upturned rim frictionally engaging said zinc container, and a plurality of perforations.

In testimony whereof, I have signed my name to this specification this 10th day of June 1924.

WILLIAM F. HENDRY.